(12) United States Patent
Tra et al.

(10) Patent No.: US 7,971,098 B2
(45) Date of Patent: Jun. 28, 2011

(54) BOOTSTRAP DEVICE AND METHODS THEREOF

(75) Inventors: Andelon X. Tra, Austin, TX (US);
David M. Lynch, Austin, TX (US);
Oswin Housty, Austin, TX (US)

(73) Assignee: Globalfoundries Inc.

( * ) Notice: Subject to any disclaimer, the term of this patent is extended or adjusted under 35 U.S.C. 154(b) by 476 days.

(21) Appl. No.: 12/054,022

(22) Filed: Mar. 24, 2008

(65) Prior Publication Data
US 2009/0240981 A1 Sep. 24, 2009

(51) Int. Cl.
*G06F 11/00* (2006.01)
(52) U.S. Cl. ............... 714/36; 714/43; 713/1; 713/2
(58) Field of Classification Search .............. 714/36, 714/43; 713/1, 2
See application file for complete search history.

(56) References Cited

U.S. PATENT DOCUMENTS

| | | | | |
|---|---|---|---|---|
| 5,583,987 A * | 12/1996 | Kobayashi et al. | ............ | 714/13 |
| 5,867,702 A * | 2/1999 | Lee | .................. | 713/1 |
| 6,058,475 A * | 5/2000 | McDonald et al. | ............... | 713/2 |
| 6,889,341 B2 * | 5/2005 | Collins et al. | ................... | 714/23 |
| 7,111,202 B2 * | 9/2006 | Cagle et al. | ..................... | 714/36 |
| 7,143,275 B2 * | 11/2006 | Cepulis et al. | .................... | 713/1 |
| 7,350,063 B2 * | 3/2008 | Schelling | ......................... | 713/1 |
| 7,430,684 B2 * | 9/2008 | Goodman et al. | ................ | 714/4 |
| 7,472,266 B2 * | 12/2008 | Kumar et al. | ..................... | 713/1 |
| 7,610,481 B2 * | 10/2009 | Cool et al. | ........................ | 713/2 |
| 2007/0067614 A1* | 3/2007 | Berry et al. | ...................... | 713/1 |
| 2008/0184021 A1* | 7/2008 | Wilson et al. | .................... | 713/2 |
| 2009/0307478 A1* | 12/2009 | Gehrmann | ........................ | 713/2 |

* cited by examiner

*Primary Examiner* — Yolanda L Wilson

(57) ABSTRACT

A method of booting a multi-processor data processing device includes establishing a link between a first processor and a memory. The link is monitored to determine if, in response to a request from the processor, expected initialization data is communicated between the memory and the first processor. If unexpected data is detected on the link, the link is severed and a new link established between a second processor and the memory to allow the second processor to initiate the boot process. This ensures that, in the event of an error in the boot process at the first processor, the device can complete the boot process, thereby reducing device downtime.

18 Claims, 4 Drawing Sheets

BOOTSTRAP DEVICE AND METHODS THEREOF

FIELD OF THE DISCLOSURE

The present invention relates to a data processing device. In particular, the present invention relates to a data processing device having multiple processors.

BACKGROUND

Data processing devices typically employ a processor to boot the device. In multi-processor devices (i.e., devices with more than one processor) one processor is designated as the bootstrap processor to boot the device. During a boot process, the bootstrap processor receives initialization information, such as BIOS information, to initialize and configure the data processor device. However, in such devices the failure of the bootstrap processor can cause errors during the boot process, rendering the data processor device inoperable and resulting in undesirable system downtime. Accordingly, there is a need for an improved bootstrap device and methods.

DETAILED DESCRIPTION

A method of booting a multi-processor data processing device includes establishing a link between a first processor and a memory that stores initialization information. The link is monitored to determine if, in response to a request from the processor, expected initialization data is communicated between the memory and the first processor. If unexpected data is detected on the link, the link is severed and a new link established between a second processor and the memory to allow the second processor to initiate the boot process. This ensures that, in the event of an error in the boot process at the first processor, the device can complete the boot process, thereby reducing device downtime. In addition, for integrated circuit devices having multiple processor cores, the failure of one core to properly execute a boot process will not result in failure of the entire device. Thus, a multi-core device having a failed processor can still be used and does not have to be discarded during manufacturing, thereby improving the manufacturing yield for the integrated circuit device.

Figure 1:
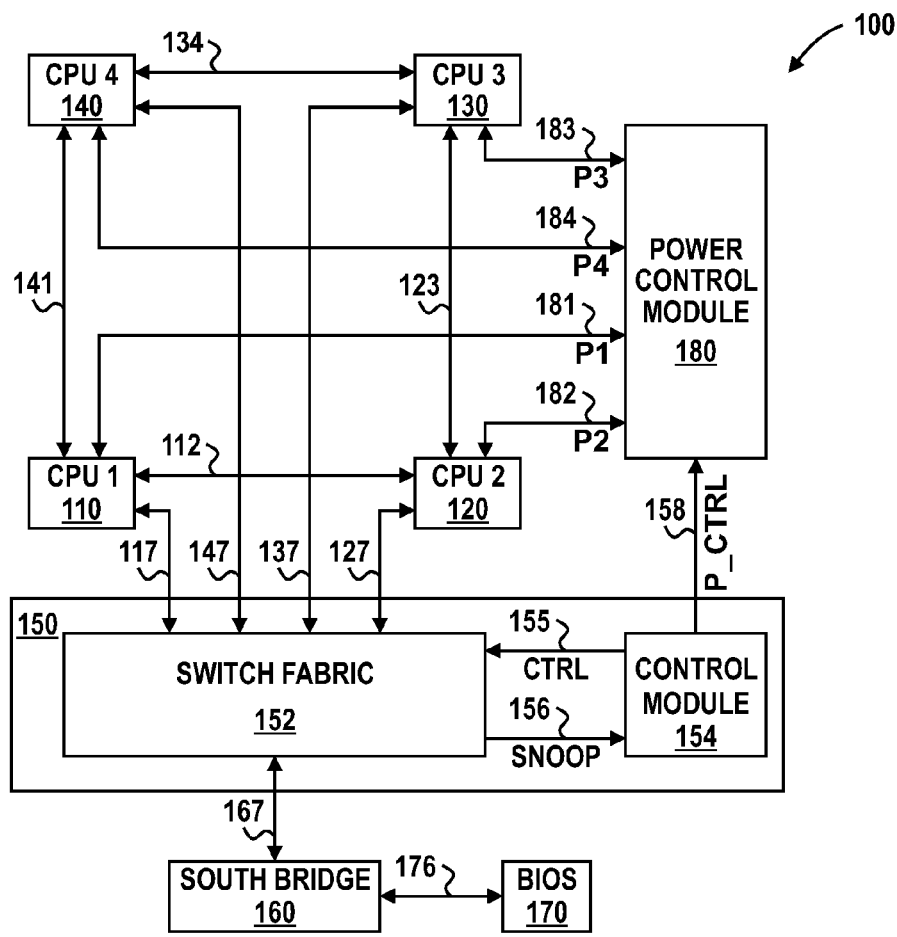
FIG. 1 is a block diagram of a data processing device according to one embodiment of the present disclosure.

FIG. 1 illustrates a data processing device 100 according to one embodiment of the present invention. The data processing device 100 includes processing devices 110, 120, 130, and 140, a crosspoint switch 150, a southbridge 160, a BIOS memory 170, and a power control module 180.

The processor 110 is connected to the processor 120 via link 112, to the processor 140 via link 141, and to the crosspoint switch 150 via link 117. The processor 110 also includes an input to receive a power control signal labeled "P1" at node 181. The processor 120 is connected to processor 130 via link 123 and to the crosspoint switch 150 via the link 127. The processor 120 further includes an input to receive a power control signal labeled "P2" at node 182. The processor 130 is connected to the processor 140 via link 134 and to the crosspoint switch via the link 137. In addition, the processor 130 includes an input to receive a power control signal labeled "P3" at node 183. The processor 140 is connected to the crosspoint switch 150 via link 147, and also includes an input to receive a power control signal labeled "P4" at node 184. The southbridge 160 is connected to the crosspoint switch 150 via link 167, and is also connected to the BIOS memory 170 via link 176. The power control module 180 includes an input to receive a signal P_CTRL and four outputs to respectively provide the signals P1, P2, P3, P4, and P5.

The crosspoint switch 150 includes a switch fabric 152 and control logic 154. The switch fabric 152 is connected to the links 117, 127, 137, 147, and 167, and also includes an input to receive a signal labeled "CTRL" and an output labeled "SNOOP."

Each of the processors 110, 120, 130, and 140, is a processing device such as a processor core, central processing unit (CPU), microprocessor unit (MPU), and the like. In response to a reset event, such as a power-on reset of the data processing device 100, each of the processors 110, 120, 130, and 140 is configured to initiate a boot process by providing a reset vector indicating the location of BIOS information via the associated link with the crosspoint switch 150. Accordingly, the reset vector is a request for BIOS information. In an embodiment, each of the processors 110, 120, 130, and 140 is configured to provide the reset vector at intervals for a specified period of time, or until expected information (e.g. BIOS information) is received via the associated link. In the event that a processor does not receive the expected information, it can terminate provision of the reset vector and designate itself as an application (i.e. non-bootstrap processor).

In addition, each of the processors 110, 120, 130, and 140 is configured to be placed in one or more power states, based on information received via the respective power control signal P1, P2, P3, or P4. As used herein, power state refers to any power state of a processor, such as an active or normal state, a sleep state, a shutdown state, and the like. For example, based on information received via the signal P2, the processor 120 can place itself in a designated power state.

The power control module 180 is configured to receive power control information from multiple locations, such as the P_CTRL signal from control module 154. The power control module 180 is further configured, based on the power control information, to provide information via the signals P1, P2, P3, and P4 to control the power state of the processors 110, 120, 130, and 140, respectively.

The southbridge 160 is configured to receive reset vector information via the link 167 and, based on that information, access initialization information, and in particular BIOS information, stored at the BIOS memory 170. As used herein, initialization information refers to information, such as BIOS information used to initialize a data processing device, such as a data processor, after a reset event. In response to receive a reset vector, the southbridge 160 accesses initialization information at a location of the BIOS memory 170 indicated by the vector. The BIOS memory 170 is configured to provide the requested BIOS information in response to the request. The southbridge 160 is configured to provide the BIOS information to the crosspoint switch 150 via the link 167. It will be appreciated that, although for purposes of discussion a southbridge is illustrated as the interface between the BIOS memory and the crosspoint switch, in other embodiments a different input/output controller could be employed.

The switching fabric 152 of the crosspoint switch 150 is configured to selectively link one of the links 117, 127, 137, and 147, to the link 167 based on information provided by the CTRL signal thereby allowing information to be transferred between the links. As used herein, a link refers to a connection between devices such that a least one of the devices can transfer information to the other via the link. Accordingly, a link can be a serial or parallel connection, a virtual communication connection, and the like. In addition, the switching fabric 152 is configured to provide information transferred over the fabric via the signal SNOOP.

The control module 154 is configured to provide information via the CTRL signal to control connection of the switching fabric 152 and to monitor data received via the SNOOP signal. In addition, the control module 154 is configured to provide power control information via the P_CTRL signal based on the monitored data.

The operation of the data processing device 100 can be understood with reference to an example. In the example an event initiating a boot process, such as a power on reset, has been detected at the data processing device 100. In response, the control module 154 sends information via the CTRL signal to control the switching fabric 152 to establish a connection between link 117 and link 167. In addition, in response to the initiating event, each of the processors 110, 120, 130, and 140 sends a reset vector via links 117, 127, 137, and 147 respectively. Because only link 117 is connected to link 167 via the switching fabric 152, only the reset vector provided by the processor 120 reaches the southbridge 160. In response to receiving the reset vector, the southbridge 160 accesses the BIOS information at the BIOS memory 170 indicated by the reset vector, and provides the information via the link 167. The BIOS information is communicated via the switching fabric 152 to the link 117, and thereby to the processor 110.

The control module 154 monitors data being transferred over the switching fabric 152 via the SNOOP signal. In response to detecting that a reset vector has been transferred, the control module 154 monitors the BIOS information transferred from the southbridge 160. As long as the data being transferred is expected data, the control module 154 maintains the link between link 167 and link 117. Expected data refers to any type of BIOS information being transferred, and can include instruction information, post codes, interrupts, data patterns, address information, command signals, and the like.

In the event that the control module 154 does not detect expected data, it provides information via the CTRL signal to disconnect link 117 from link 167, and further provides information to connect link 127 with link 167. Accordingly, the next reset vector sent by the processor 120 reaches the southbridge 160, which provides the vector to the BIOS memory 170, and sends BIOS information to the processor 120 via the links 167 and 127. The control module 154 monitors this BIOS information, and maintains the link as long as it detects expected data. The control module 154 continues to selectively connect each of the processors 110, 120, 130, and 140 in succession until all expected data has been transferred via the switching fabric to one processor, indicating the boot process is complete. The data processing device 100 thus successively selects each of the processors 110, 120, 130, and 140 as the bootstrap processor for the device until the device is successfully booted.

In addition, in response to failing to detect expected data, the control module 154 can send information via the P_CTRL signal to change the power state of the processor that was connected to the BIOS memory 170 when the failure was detected. Thus, if the control module 154 fails to detect expected data when the processor 140 is connected to the southbridge, the control module 154 can send information via the P_CTRL signal to place the processor 140 in a shutdown state or other power state. In response to receiving the information, the power control module 180 provides information via the signal P4 to place the processor 140 in the designated state. Accordingly, a processor that failed to initialize the data processing device 100 can be placed in a shutdown or low power state, thereby reducing power consumption of the data processing device 100.

Figure 2:
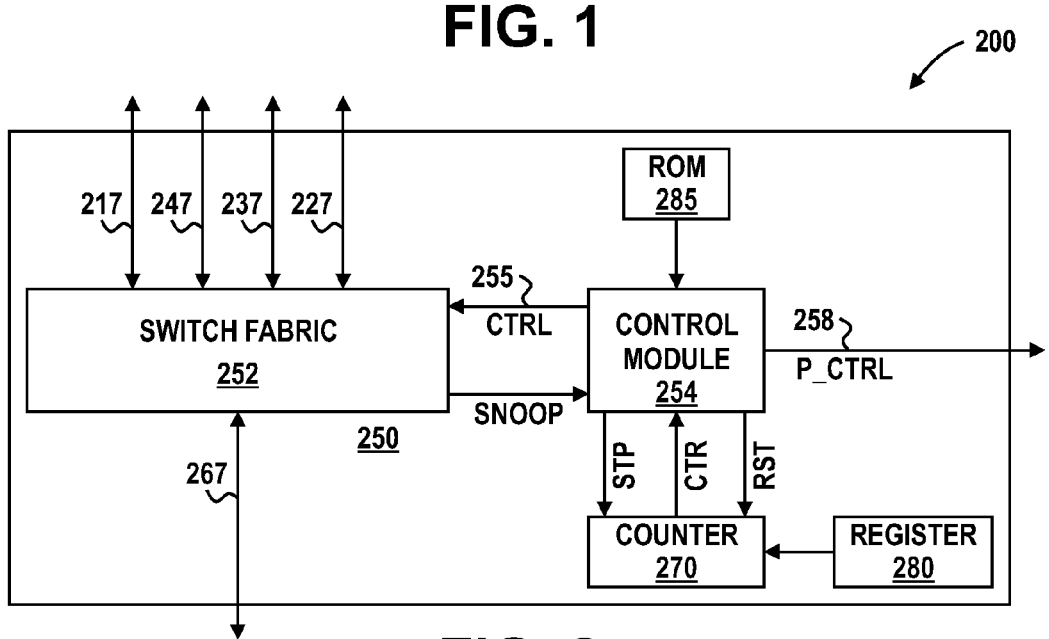
FIG. 2 is a block diagram of a particular embodiment of the crosspoint switch of FIG. 1.

Referring to FIG. 2, a particular embodiment of a cross-point switch 200, corresponding to the cross-point switch 100 of FIG. 1, is illustrated. The crosspoint switch 200 includes a switching fabric 252, a control module 254, a counter 270, register 280 to store a time threshold value, and read only memory (ROM) 285. The switching fabric 252 is connected to links 217, 227, 237, 247 and 267, corresponding to links 117, 127, 137, 147, and 167 of FIG. 1, respectively. The switching fabric 252 includes an input to receive the CTRL signal and an output to provide the SNOOP signal. The control module 254 includes an input to receive the SNOOP signal, an input to receive a signal labeled "CTR", and input connected to an output of the ROM 285, an output to provide the signal CTRL, an output to provide the signal P_CTRL, an output to provide a signal labeled "RST", and an output to provide a signal STP. The counter 270 includes an input to receive the RST signal, an input to receive the STP signal, and an output to provide the CTR signal. The counter 270 also includes an input to access the time threshold value stored at the register 280.

The switch fabric 252 and the control module 254 are configured similarly to the corresponding elements of FIG. 1. In addition, the control module 254 is configured to access data stored at the ROM 285, which reflects data expected to be transferred over the switch fabric 252 during boot of the data processing device 100. The control module 254 is configured to compare data being received via the SNOOP signal with the expected data, and in response to detecting expected data, assert the RST signal. In addition, in response to determining the CTR signal has been asserted, the control module 254 is configured to provide information via the CTRL signal to change which of the processors 110, 120, 130, and 140 is connected to the southbridge 160.

The counter 270 is configured to, in response to the RST signal, load the time threshold value stored in the register 280. The counter 270 is further configured to count down from the loaded value and, upon reaching a predetermined value (e.g. zero), assert the CTR signal. Moreover, in response to assertion of the STP signal, the counter is configured to stop counting down.

In operation, in response to a boot initiating event, the control module 254 provides information via the CTRL signal to connect one of the processors 110, 120, 130, or 140 to the southbridge 160 via the switch fabric 252. The control module 254 also asserts the RST signal, initiating a countdown at the counter 270. The control module 254, via the SNOOP signal, monitors BIOS information transferred via the switch fabric 252 and compares the BIOS information to the expected data stored at the ROM 285. In response to detecting expected data, the control module 254 asserts the RST signal to reset the counter and initiate another countdown. If all expected data has been detected, the control module 254 asserts the STP signal, thereby stopping the counter. Accordingly, as long as the transferred BIOS information matches the expected data, the control module 254 prevents the counter from asserting the CTR signal, and thereby maintains the link between the selected boot processor and the southbridge 160.

In the event the counter 270 reaches the predetermined value, this indicates expected data was not received in the time indicated by the time threshold value stored at the register 280. Accordingly, the counter 270 asserts the CTR signal. In response, the control module 254 provides information via the CTRL signal to control the switch fabric 252 to connect another processor to the southbridge 160. Thus, in response to not detecting expected data in a time interval based on the time threshold value, the crosspoint switch changes the designated bootstrap processor.

Figure 3:
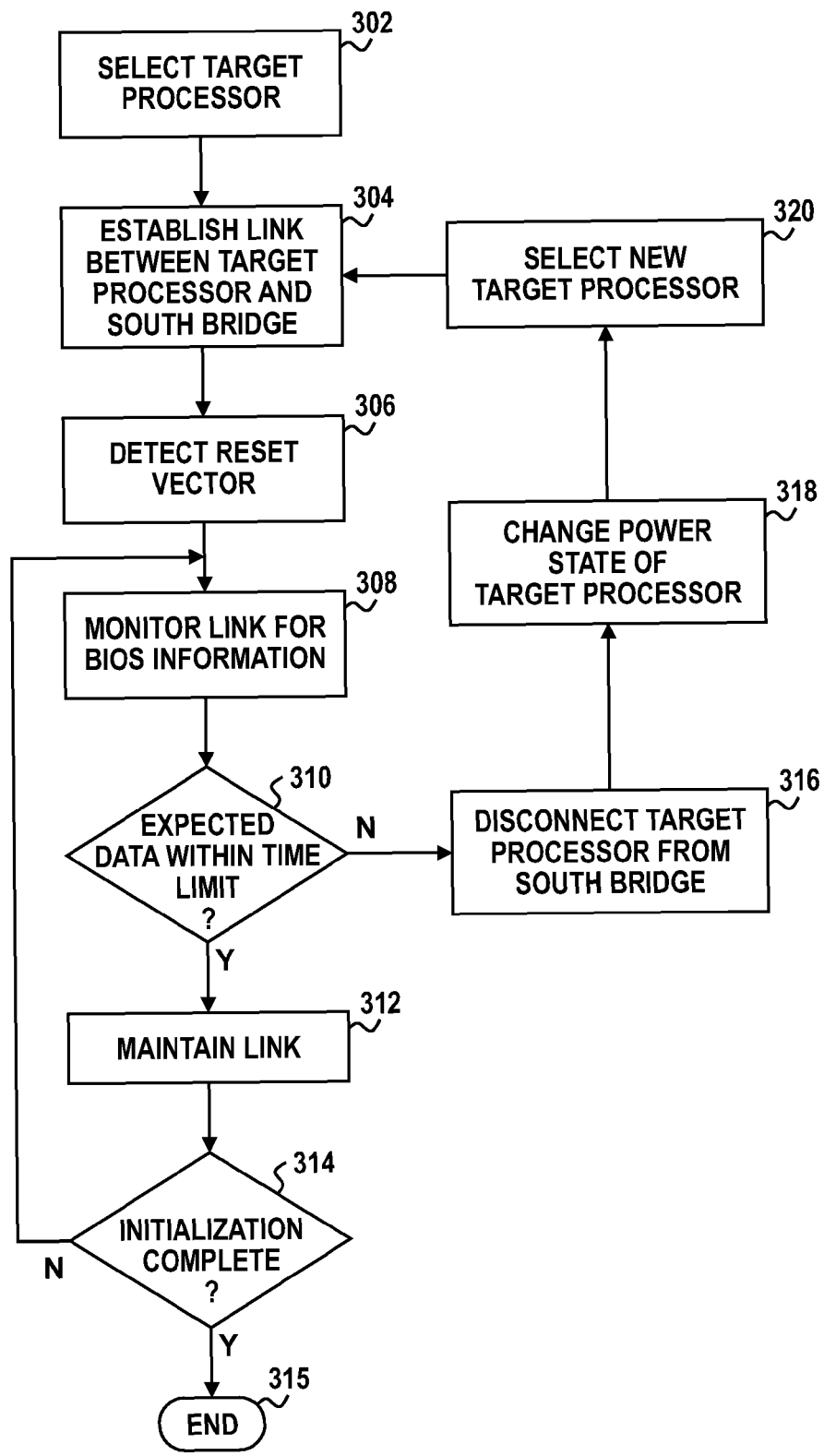
FIG. 3 is a flow chart illustrating a method of booting a data processing device in accordance with one embodiment of the present disclosure.

FIG. 3 illustrates a flowchart of a particular embodiment of a method of booting a data processing device. At block 302, a target processor is selected. The target processor can be a predetermined processor selected in response to a power on reset event, a randomly selected processor, or a processor selected based on another criterion. At block 304, a link is established between the target processor and a southbridge, whereby information can be transferred between the southbridge and the processor.

At block 306, a reset vector is detected as being transferred via the established link. At block 308, the link is monitored for initialization information being transferred from the southbridge to the target processor is monitored. At block 310 it is determined if expected data has been detected on the monitored link within a specified time limit. If so, the method flow moves to block 312 and the link is maintained. The method flow moves to block 314 and it is determined whether initialization of the data processing device is complete. If not, the method flow returns to block 308 to continue monitoring initialization information between transferred via the link. If the initialization of the data processing device is complete, the method flow moves to block 315 and the method ends.

If, at block 312, the expected data has not been detected, the method flow moves to block 316 and the link between the southbridge and the target processor is disconnected. At block 318, the power state of the target processor is changed. For example, the target processor can be placed in a shutdown state so that it can be replaced with a new processor while other device processors remain in operation. At block 320, a new target processor is selected, and the method flow returns to block 304 to establish a link with the newly selected target processor. Thus, processors are successively selected until one processor is able to complete processing of the BIOS information.

Figure 4:
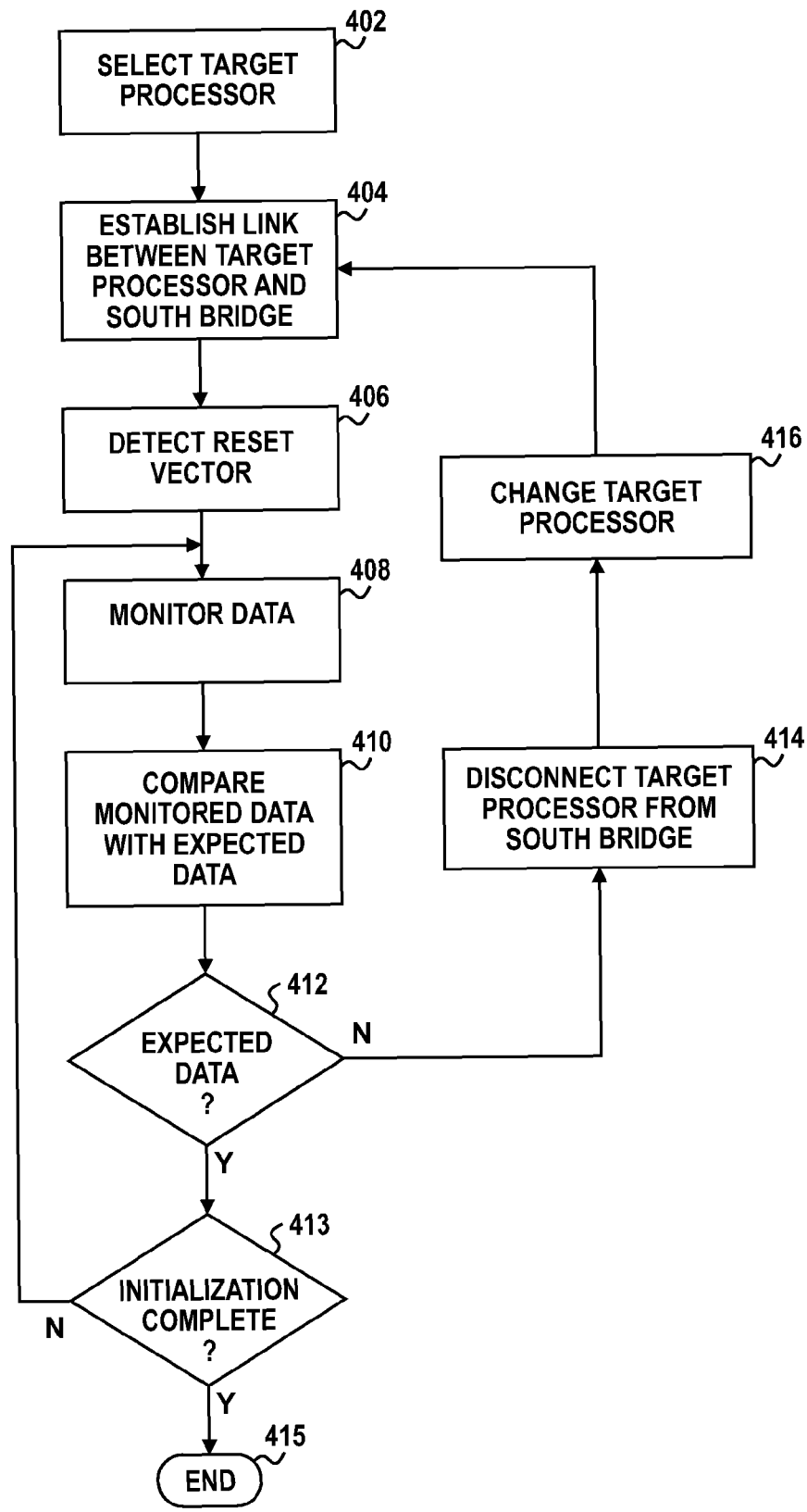
FIG. 4 is a flow chart illustrating a method of booting a data processing device in accordance with another embodiment of the present disclosure.

Referring to FIG. 4, a flow diagram of an alternative embodiment of a method of booting a data processing device is determined. At block 402, a target processor is selected. At block 404, a link is established between the target processor and a southbridge, whereby information can be transferred between the southbridge and the processor.

At block 406, a reset vector is detected as being transferred via the established link. At block 408, the link is monitored for BIOS information being transferred from the southbridge to the target processor is monitored. At block 410, data monitored on the link is compared with expected data. The expected data can be stored in a ROM memory or otherwise hardwired at the data processing device. At block 412, it is determined whether the comparison indicates that the monitored data matches the expected data. If so, the method moves to block 413 and it is determined whether initialization of the data processing device is complete. If not, the method flow returns to block 408 to continue monitoring initialization information between transferred via the link. If the initialization of the data processing device is complete, the method flow moves to block 415 and the method ends.

If, at block 412, the monitored information does not match expected data, the method flow moves to block 414 and the link between the target processor and the southbridge is disconnected. The method moves to block 416 and a new target processor is selected. The method flow returns to block 404 to establish a link with the newly selected target processor.

Figure 5:
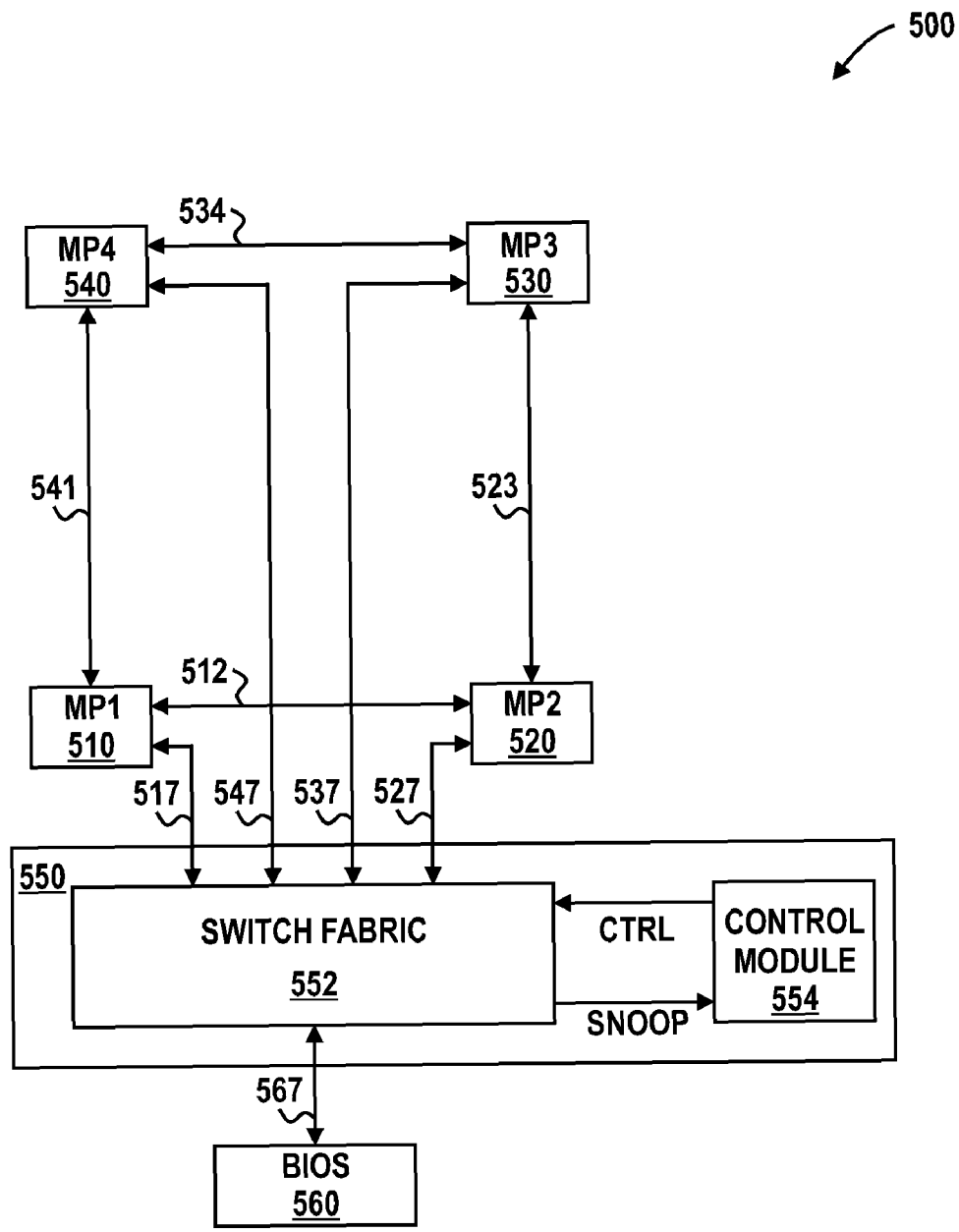
FIG. 5 is a block diagram of a data processing device according to one embodiment of the present disclosure.

FIG. 5 illustrates a block diagram of a particular embodiment of a data processing device 500. The data processing device 500 includes processing devices 510, 520, 530, and 540, a crosspoint switch 550, and a BIOS memory 570.

The processor 510 is connected to the processor 520 via link 512, to the processor 540 via link 541, and to the crosspoint switch 550 via link 517. The processor 120 is connected to processor 530 via link 523 and to the crosspoint switch 550 via the link 527. The processor 530 is connected to the processor 540 via link 534 and to the crosspoint switch via the link 537. In addition, the processor 530 includes an input to receive a power control signal labeled "P3." The processor 540 is connected to the crosspoint switch 550 via link 547. The BIOS memory is connected to the crosspoint switch via link 567.

The crosspoint switch 150 includes a switch fabric 552 and control logic 554. The switch fabric 552 is connected to the links 517, 527, 537, 547, and 567, and also includes an input to receive a signal labeled "CTRL" and an output labeled "SNOOP."

The data processing device 500 is configured to successively connect processors 510, 520, 530, and 540 to the BIOS memory 570 until a boot process is complete, in similar fashion to the data processing device 100 of FIG. 1. However, as illustrated, data processing device 500 does not include a southbridge. Accordingly, the crosspoint switch 570 selectively connects the processors 510, 520, 530, and 540 to the BIOS memory directly through the link 560. Further, in response to a reset vector being provided via the link 560, the BIOS memory is configured to provide BIOS information directly to the processor that provided the reset vector.

Other embodiments, uses, and advantages of the disclosure will be apparent to those skilled in the art from consideration of the specification and practice of the disclosure disclosed herein. For example, although an initialization process has been described whereby multiple processor devices concurrently send reset vectors in an attempt to initialize a device, in other embodiments each processor device can send a reset vector successively, in round robin fashion, or according to another configuration. It will further be appreciated that, although some circuit elements and modules are depicted and described as connected to other circuit elements, the illustrated elements may also be coupled via additional circuit elements, such as resistors, capacitors, transistors, and the like. The specification and drawings should be considered exemplary only, and the scope of the disclosure is accordingly intended to be limited only by the following claims and equivalents thereof.

What is claimed is:

1. A method, comprising:
   establishing a first link between a memory and first processor device of a plurality of processor devices;
   in response to detecting at the first link a first request for initialization information, monitoring at a control module separate from the first processor the first link for the initialization information; and
   maintaining the first link in response to determining at the control module that expected initialization data has been transferred via the first link.

2. The method of claim 1, further comprising:
in response to determining that expected data has not been transferred via the first link,
establishing a second link between the memory and a second processor device of a plurality of processor devices.

3. The method of claim 2, further comprising ending the first link in response to determining that expected initialization data has not been transferred via the first link.

4. The method of claim 2, further comprising:
changing a power state of the first processor device in response to determining that expected initialization data has not been transferred.

5. The method of claim 2, wherein establishing the second link comprises establishing the second link in response to determining expected initialization data has not been transferred via the first link in a specified period of time.

6. The method of claim 2, wherein establishing the second link comprises establishing the second link in response to determining expected initialization data has not been transferred based on a comparison of data monitored at the first link with expected initialization data.

7. The method of claim 2, further comprising:
in response to detecting at the second link a second request for initialization information, monitoring the second link for the initialization information; and
maintaining the second link in response to in response to determining expected initialization data has been transferred via the second link.

8. The method of claim 1, wherein the first request for initialization information comprises a reset vector.

9. The method of claim 1, wherein establishing the first link comprises coupling the first processor device to a southbridge.

10. A method, comprising:
initiating a first access of initialization information at a memory to receive initialization information at a first processor device; and
detecting a first error associated with the first access in response to determining the first processor has failed to receive expected initialization data in a specified period of time;
in response to detecting the first error, receiving the initialization information at a second processor device.

11. The method of claim 10, further comprising:
coupling the first processor device to the memory; and
in response to detecting the first error, coupling a second processor device of the plurality of processor devices to the memory.

12. The method of claim 11, further comprising:
decoupling the first processor device from the memory in response to detecting the first error;
initiating a second access of the initialization information at the memory in response to coupling the second processor; and
in response to detecting a second error associated with the second access, decoupling the second processor device from the memory.

13. The method of claim 12, further comprising:
in response to detecting the second error, coupling a third processor device to the memory.

14. The method of claim 10, further comprising setting a power state of the first processor device in response to detecting the first error.

15. The method of claim 14, wherein setting a power state comprises placing the first processor device in a shutdown state.

16. A device, comprising:
a first processor coupled to a first link;
a switch fabric coupled to the first link and to a second link, the switch fabric including a control input and configured to selectively couple the first link to the second link based on control information received at the control input, and further comprising an output configured to provide an indication of information being transferred via the switch;
a control module comprising an input coupled to the output of the crosspoint switch and a control output coupled to the control input of the crosspoint switch, the control module configured to control the switch fabric to selectively couple the first bus to the second bus based on information received at the input of the control module and further configured to control the switch fabric to couple the first link to the second link in response to initiation of a boot sequence at the device, and control the switch fabric to decouple the first link from the second link in response to failing to detect expected initialization data at the input of the control module.

17. The device of claim 16, further comprising:
a second processor coupled to a third link, the third link coupled to the switch fabric; and
wherein the control module is configured to control the switch fabric to couple the third link to the second link in response to failing to detect expected initialization data at the input of the control module.

18. The device of claim 16, further comprising:
a power control module coupled to the first processor and the control module, the power control module configured to change a power state of the first processor in response to the control module failing to detect the expected initialization data.

* * * * *